May 31, 1932. F. G. WITHROW 1,861,148
MIRROR BRACKET
Filed Nov. 11, 1929
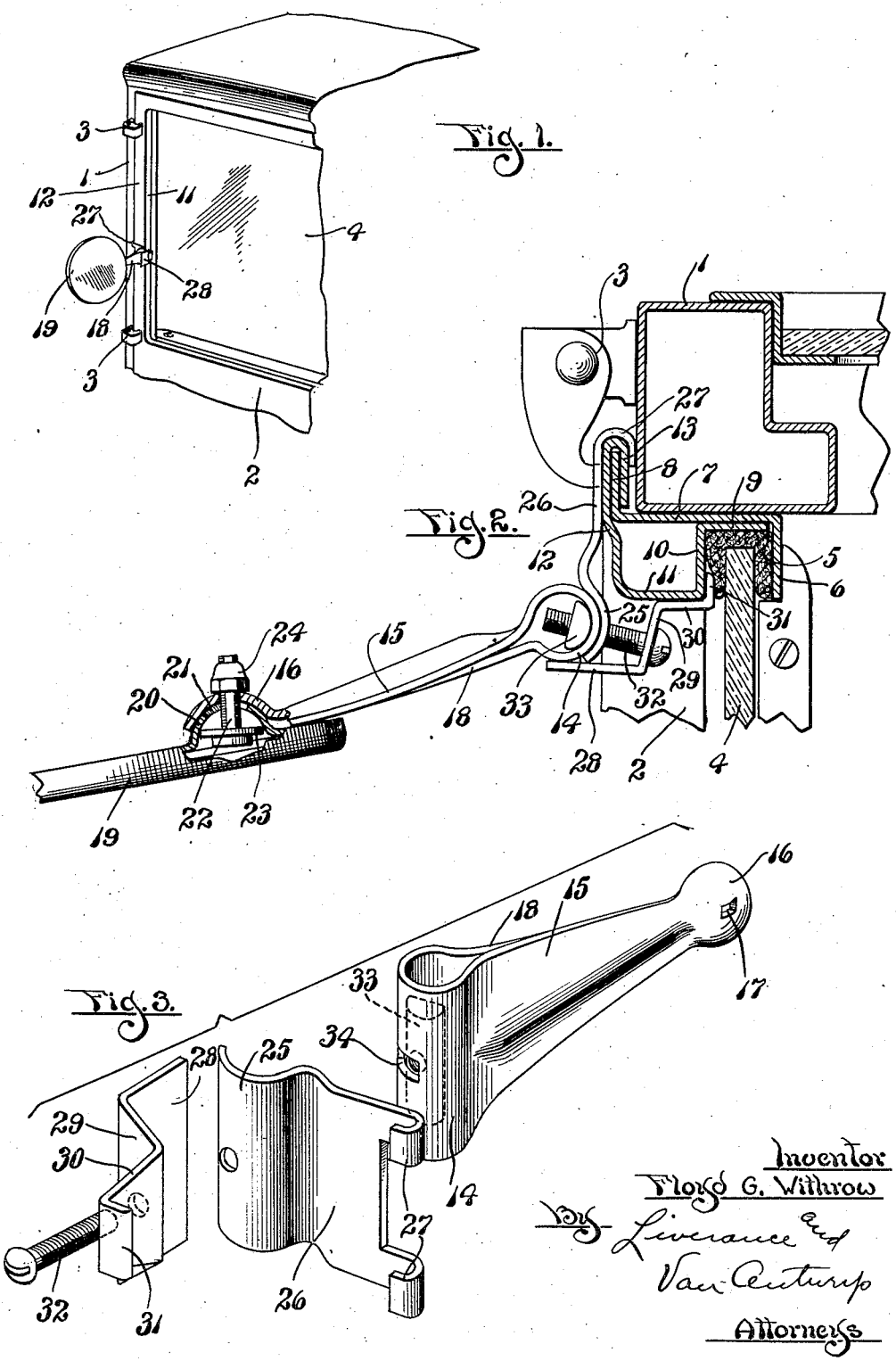
Inventor
Floyd G. Withrow
By Liverance and
Van Centurip
Attorneys Patented May 31, 1932

1,861,148

UNITED STATES PATENT OFFICE

FLOYD G. WITHROW, OF GRAND RAPIDS, MICHIGAN

MIRROR BRACKET

Application filed November 11, 1929. Serial No. 406,213.

This invention relates to a mirror bracket adapted for connection to the door of an automobile at any desired height, the bracket having adjustable means of connection to the door whereby it may be shifted vertically to different positions on the door and then secured firmly in any position to which it may be adjusted.

It is a primary object and purpose of the present invention to provide a very practical and economical construction of mirror supporting bracket for attachment to the left front door of a closed car automobile which may be adjustably secured in desired position so as to govern the height of the mirror, and at the same time the mirror may be itself adjusted to an indefinite number of different positions after the securing means for the bracket is secured against movement on the door. Various other objects and purposes together with the novel construction which I have provided for attaining the same will appear upon an understanding of the invention had from the following description, taken in connection with the accompanying drawings, in which, Fig. 1 is a fragmentary perspective view illustrating a mirror mounted in accordance with my invention on an automobile front door.

Fig. 2 is a fragmentary enlarged partial horizontal section and plan showing the manner in which the mirror bracket is constructed and mounted on the door, and Fig. 3 is a perspective view illustrating the various parts of the mirror bracket construction in separated relation.

Like reference characters refer to like parts in the different figures of the drawings.

In the construction of an automobile body, vertical front posts 1 of sheet metal are used between which the windshield is located and to which the front doors 2 may be hinged by means of hinges 3. The doors at their upper portions include vertically sliding glass panels 4 which slide in fabric or felt channel guides 5 as shown in Fig. 2.

The felt channel guide 5 at the front of the door at one side is retained by a flange 6 of sheet metal turned to the rear from a web 7, the other edge portion of the web being turned forwardly to provide a vertical flange 8. The back of the channel guide 5 is against a flange 9 of sheet metal, which bears against the web 7 previously described and is secured thereto, and from which a flange 10 extends to the rear spaced from and parallel to the previously described flange 6. An outwardly extending section 11 is bent from the flange 10 for a short distance and is then turned forward as indicated at 12, so as to lie alongside the flange 8 and then bent in a U-shaped bend 13 around said flange 8. This construction at the front upper portion of the door for providing a channel recess to receive the channel felt guide 5 is old and well known particularly in Ford automobiles.

The mirror bracket, which is to be applied to the door, includes a bracket arm formed from a single length of sheet metal which is bent between its ends into an open substantially cylindrical form indicated at 14. One part 15 of the metal extends from the cylindrical end 14 and terminates at its free end in the concaved cup 16 through which an oblong opening 17 is made. The other part 18 of the metal extends from the open cylindrical end portion 14 and is brought against the part 15 and permanently connected thereto, preferably by welding.

The mirror 19 has a sheet metal back which at one side is formed with a projecting boss 20 shaped to fit the concavity of the part 16. It has an arc shaped slot 21 therethrough for the passage of a bolt 22 which has flattened sides so that it may readily pass through the oblong opening 17. The bolt passes through a disc 23 within the projection 20 and receives a nut 24 at its outer end. With this construction the mirror may be swung to different positions with respect to the bracket arm about the axis of the bolt 22 or it may be adjusted to lie in different vertical planes, the slot 21 permitting an angular movement of the mirror with respect to the bracket arm.

The connecting means used for adjustably attaching the bracket arm to the door comprises two members of sheet metal with a bolt to be used therewith. One of said members is formed at one end with a curved section 25 which fits against the rounded outer surface of the cylindrical end 14 of the bracket arm. It has a flat section 26 extending therefrom adapted to lie alongside the part 12 and formed at its end with U-shaped hooks 27 to hook around the edge of the U-bend 13 previously described. The other member is formed from a plate of flat metal with a terminal section 28 which may bear against the cylindrical end portion 14 of the bracket arm, an intermediate section 29 bent at an angle somewhat greater than a right angle to the part 28, a second intermediate section 30 bent at a similar angle from the other edge of the section 29, and a terminal lip 31 which is adapted to be received between the felt channel guide 5 and the flange 10 of the channel in which the guide is located.

A bolt 32 passes through the section 29 and through the curved section 25 of the first member and thence through a slot 34 in the cylindrical end 14 of the bracket arm so as to thread through a somewhat elongated bar 33 which is shaped to fit against the inner concave surface of the cylindrical end 14 of the bracket arm. Tightening the bolt binds the parts together and connects them securely to the door in the position shown in Fig. 2.

With a construction as described by merely loosening the bolt or screw 32 the parts directly connecting with the door may be shifted vertically to different positions and then by tightening the bolt such parts are securely clamped against movement with respect to the door. At the same time, however, the bracket arm 15, while held against any accidental movement, may be moved back and forth within the limits permitted by the slot 34 as the frictional bind of the parts on the bracket arm is not such as to preclude movement of the bracket arm even when the bolt is tightened; and as previously described the mirror itself has a certain range of adjustment with respect to the bracket arm.

This construction is one which is very economical to produce. All the parts are of sheet metal readily formed with suitable dies. The connection to an automobile door is simple and easy. The invention is defined in the appended claims and is to be considered comprehensive of all forms of structure coming within their scope.

I claim:

1. In combination, a supporting arm having a cylindrical portion with a longitudinal opening therethrough, two attaching members located each at one end against the cylindrical portion of the arm and formed at their opposite ends for connection with an automobile door, a bolt passing through said attaching members and through the cylindrical end of said arm, and a bar having a threaded opening therethrough located within the cylindrical portion of said arm and bearing against the inner side thereof through which said bolt threads, for the purpose described.

2. A construction comprising in combination, a supporting bracket arm, one end of said arm being of substantially cylindrical form with a substantially cylindrical longitudinal opening therethrough, an attaching member having one end curved to fit the outer side of the cylindrical end of the arm and formed at its opposite end with U-shaped hook engaging means, a second attaching member formed from a plate of flat metal and provided with a terminal section adapted to bear against said cylindrical end of the arm, an intermediate section bent at an angle from said terminal section, a second intermediate section bent from the first intermediate section and lying in a plane substantially parallel to the plane of the terminal section, and a terminal lip bent substantially at right angles from the second intermediate section, a threaded bolt passing through the first intermediate section and through the curved end portion of the first attaching member, and through the adjacent wall of the cylindrical end portion of the arm, and a bar having a convex side located within said cylindrical end portion of the arm and bearing against its curved inner side through which said bolt is threaded.

3. In a construction of the class described, a bracket arm formed at one end with substantially cylindrical end portion having a longitudinal vertical opening therethrough, two connecting devices bearing at one end against the outer side of said cylindrical end of the arm and formed at their opposite ends with automobile door engaging parts, a bolt passing through said connecting devices and through a wall of the cylindrical end portion of said arm, and a nut located within the opening in said cylindrical end portion of the arm through which the bolt threads.

4. In a structure of the class described, a supporting arm formed from a length of flat metal bent between its ends into substantially open cylindrical form, the free end portions extending therefrom being permanently secured together, whereby one end of the arm is of curved form having a longitudinal opening therethrough, an attaching member formed from a piece of flat metal formed at one end portion into curved shape to bear against the cylindrical end of said arm, and at the opposite end with U-shaped hook engaging means, a second connecting member formed from a single length of flat metal with a terminal section adapted to bear against the cylindrical end of the arm, an intermediate section bent from said terminal section at an angle thereto, a second intermediate section bent from the first intermediate section and lying in a plane substantially parallel to said terminal section, and a terminal lip bent from the second intermediate section, a threaded bolt passing through the first intermediate section of the second connecting member and through the curved end portion of the first connecting member and through a wall of the cylindrical end of said arm, and a nut located within the cylindrical end of said arm through which said bolt is threaded.

In testimony whereof I affix my signature.

FLOYD G. WITHROW.